United States Patent [19]

Lindner

[11] 4,300,622

[45] Nov. 17, 1981

[54] DISCHARGING A LATENT-HEAT ACCUMULATOR

[75] Inventor: Friedrich Lindner, Stuttgart, Fed. Rep. of Germany

[73] Assignee: Deutsche Forschungs- und Versuchsanstalt für Luft- und Raumfahrt e.V., Bonn, Fed. Rep. of Germany

[21] Appl. No.: 48,592

[22] Filed: Jun. 14, 1979

[30] Foreign Application Priority Data

Jun. 16, 1978 [DE]  Fed. Rep. of Germany ....... 2826404

[51] Int. Cl.³ ............................................. F28D 15/00
[52] U.S. Cl. ........................................ 165/1; 165/111; 165/104.13; 165/104.17; 126/436
[58] Field of Search ......................... 165/104 S, 111, 1; 126/435, 436, 400

[56] References Cited

U.S. PATENT DOCUMENTS

| | | | |
|---|---|---|---|
| 2,996,894 | 8/1961 | Shade | 165/104 S X |
| 3,107,052 | 10/1963 | Garrison | 165/104 S X |
| 4,086,958 | 5/1978 | Linder et al. | 165/104 S |
| 4,109,702 | 8/1978 | Greene | 165/111 X |
| 4,180,124 | 12/1979 | Shurcliff | 165/104 S X |
| 4,219,072 | 8/1980 | Barlow | 165/104 S X |

*Primary Examiner*—Albert W. Davis
*Attorney, Agent, or Firm*—Laubscher, Philpitt & Laubscher

[57] ABSTRACT

A latent heat accumulator gives up its heat when a heat exchange medium is passed through the accumulator and around a circuit containing an external heat sink. The heat storage medium in the accumulator changes its state from liquid to solid as it gives up heat. In order to prevent heat exchange medium from being trapped by the heat storage medium as it solidifies, the exchange medium is always introduced directly into a zone where the storage medium is liquid.

10 Claims, 2 Drawing Figures

DISCHARGING A LATENT-HEAT ACCUMULATOR

FIELD OF THE INVENTION

The invention relates to a method of discharging a latent-heat accumulator, the storage medium of which changes during charging from the solid to the liquid state and from the liquid to the solid state during discharging, in which for charging and discharging a heat exchanger medium immiscible with the storage medium is conveyed through the latter.

The invention further relates to a latent heat accumulator.

BACKGROUND OF THE INVENTION

In the Lindner et al U.S. Pat. No. 4,086,958 a latent-heat accumulator has been described, in which a latent heat storage medium, for example Glauber's salt, is alternately present in the liquid and solid state. For "charging" the latent-heat accumulator the latter is fed with a heat exchanger medium which is not miscible with the heat storage medium, for example a special oil, which during its passage through the storage medium transfers heat thereto and causes it to melt. The specifically lighter heat exchanger medium collects above the heat storage medium and can be recycled therefrom to a heat source.

For discharging, again a non-miscible heat exchanger medium is employed, which on passing through the heat storage medium extracts heat therefrom, during which the heat storage medium changes into the solid state. The heat exchanger medium heated up in this manner collects above the heat storage medium and can be conveyed therefrom to a consumer unit.

In the known apparatus, provision is made by an appropriate arrangement of the feed apertures of the heat exchanger medium to ensure that, for achieving a heat transfer as efficient as possible between the heat exchanger medium and the heat storage medium, the heat exchanger medium has to cover a path as long as possible within the heat storage medium. Preferably, the heat exchanger medium is introduced at the bottom of the storage container into the heat storage medium and traverses the entire depth of the latter in the form of small droplets or the like.

It has been found, that during prolonged operation of such a latent-heat accumulator, heat exchanger medium is retained to an increasing extent in the solid-phase zone of the heat storage medium, so that the position of the boundary surface between the heat storage medium and the heat exchanger medium is progressively displaced during continued operation. This gives rise to the danger of pipes, fittings and secondary heat exchangers becoming blocked.

SUMMARY OF THE INVENTION

The underlying purpose of the invention is to prevent this undesirable enrichment of heat exchanger medium in the solid-phase zone of the heat storage medium, without impairing in any way the heat transfer efficiency during discharging of the accumulator.

According to the invention, during discharging of the accumulator, the liquid or gaseous heat exchanger medium is introduced always directly into the liquid zone of the heat storage medium while avoiding a direct contact between the heat exchanger medium and the solid zone of the heat storage medium.

Thus, at variance with conventional practice, it is proposed within the scope of the present invention not to allow the heat exchanger medium to run through the entire depth of the heat storage medium during discharging, but rather to introduce it directly into that—sometimes rather thin—zone in which the heat storage medium is liquid. As a rule, this has the consequence that the path length, over which the heat exchanger medium is in heat transfer contact with the heat storage medium, becomes substantially shorter than in the conventional modes of operation, in which the heat exchanger medium has to pass through the entire depth of the heat storage medium. It has now been surprisingly found, that this shortening of the contact path length does not lead to a deterioration of the heat transfer properties, but, on the contrary, yields even better heat transfer characteristics.

It has also been found that an enrichment of heat exchanger medium in the solid-state zone of the heat storage medium is substantially eliminated. Even though the reason for this absence of enrichment has not yet been sufficiently clarified in detail, the fact that the heat storage medium is not in contact with the heat exchanger medium during solidification nevertheless appears to be significant.

During cooling, the liquid heat storage medium can solidify only if the liquid phase contains seed crystals, which may, for example, be finest crystals of the heat medium. Without such seed crystals the temperature of the liquid medium can fall substantially below the freezing point without crystallization taking place, in which case the term "undercooled liquid phase" is applied. In particular, with the preferredly employed heat storage medium, namely Glauber's salt, the undercooling effect is very pronounced, since the temperature of the liquid phase can fall to 17° below the temperature of crystallization.

Thus, crystallization occurs in the latent-heat accumulator at all those points where seed crystals are brought in which, as a rule, originate in the solid bottom sediment, where the heat storage medium is in crystalline form. In the conventional methods, in which the heat exchanger medium passed through the solid bottom sediment of the heat storage medium, the heat exchanger medium always carried a multiplicity of seed crystals with it into the liquid zone of the heat storage medium. The cooling of the heat storage medium caused by the heat exchanger medium therefore led immediately to crystallization, since precisely in that zone in which the cooling of the heat storage medium took place, seed crystals were brought in by the heat exchanger medium. In the course of this crystallization, which took place in direct contact with the heat exchanger medium which had brought in the seed crystals, a portion of the heat exchanger medium was trapped by the growing crystals of the heat storage medium and transported together with the crystals into the solid bottom deposit as the crystals sank down owing to their greater specific weight.

The method according to the invention avoids contact between the heat exchanger medium and the solid phase of the heat storage medium during discharging of the accumulator, so that normally the heat exchanger medium does not carry with it any seed crystals. In that zone where the heat transfer between the heat exchanger medium and the heat storage medium takes place there are thus no seed crystals. The crystallization of the heat storage medium occurs in other zones, for example close to the bottom deposit, where more seed crystals are contained in the heat storage medium. However, practically no heat exchanger medium is present in this zone, so that a trapping of heat exchanger medium by the crystals there forming in the heat storage medium does not take place.

Thus, by the introduction of the heat exchanger medium into the liquid zone of the heat storage medium, a spatial separation is achieved between heat transfer and crystallization, respectively, and as a consequence, the heat exchanger medium, which does not mix with the liquid heat storage medium, can collect in totality above the heat storage medium. With the application of this method, losses of heat exchanger medium during discharging can be practically eliminated.

The heat exchanger medium may be introduced into the liquid heat storage medium during discharging in proximity to the upper boundary surface thereof.

For example, the heat exchanger medium can be allowed to enter the storage medium immediately below the boundary surface. It is also possible to introduce the heat exchanger medium into the storage medium in the form of a jet which is generated above the boundary surface.

It is advantageous to introduce the heat exchanger medium into the storage medium obliquely relative to the boundary surface.

It has further been found to be advantageous to introduce the heat exchanger medium into the liquid heat storage medium in such a manner that in the latter a circulatory flow and/or turbulence is caused. This substantially increases the efficiency of the heat transfer, and in addition, an excessive undercooling of the liquid heat storage medium is prevented, since the circulatory flow and/or turbulence also brings about a distribution of seed crystals in the liquid zone of the heat storage medium. However, since this distribution is not effected directly by the heat exchanger medium but indirectly by the turbulence in the heat storage medium, the frequency of a crystallization in the immediate vicinity of the heat exchanger medium is nevertheless substantially lower than with the conventional methods, so that trapping of the heat exchanger medium is substantially avoided.

The circulatory flow and/or turbulence in the liquid zone of the heat storage medium has an additional favorable effect. If, for example, Glauber's salt is used as heat storage medium, then there arises the difficulty associated with the "incongruent" melting of the latter, i.e., solid anhydride of the salt is formed during melting which sinks to the bottom. Since this alters the composition of the storage medium, it is necessary to redissolve this anhydride, which can be effected by a corresponding addition of solvent (water or dilute solution, for example the diluted salt hydrate solution formed during melting). The turbulence imposed on the liquid heat storage medium leads to an intensified contact between the liquid phase of the heat storage medium and the solid phase in which the anhydride is deposited, and thus to a reversible solution of the anhydride. In this way, a constant composition of the heat storage medium is assured.

The invention also provides a latent heat accumulator comprising a storage tank containing a heat storage medium which changes from the solid to the liquid state during charging, and from the liquid to the solid state during discharging, a charging circuit for heating a heat exchanger medium and passing it through the storage medium, and a discharging circuit for cooling the heat exchanger medium and having feed apertures through which the cooled heat exchanger medium is passed into a liquid zone of the heat storage medium throughout the solidification of the storage medium.

It is advantageous if the feed apertures can be selectively closed, in order to make possible an introduction of the heat exchanger medium exclusively into the liquid storage medium in accordance with the quantity of solid storage medium.

In particular, provision can be made for the arrangement of feed apertures at various depths below the boundary surface between the heat storage medium and the heat exchanger medium.

The feed apertures can be so arranged, that the emerging heat exchanger stream is guided parallel to a wall or the bottom of the storage container or the boundary surface between heat storage medium and heat exchanger medium.

All the measures described in the foregoing relate to the discharging of the heat accumulator, that is, to the extraction of heat therefrom. The charging of the heat accumulator is effected in a conventional manner, i.e. the heated heat exchanger medium is conveyed as far as possible through the entire depth of the heat storage medium, since the difficulties of trapping of heat exchanger medium associated with the crystallization of the heat storage medium naturally do not occur during charging.

BRIEF DESCRIPTION OF THE DRAWING

The following description of preferred forms of embodiment of the invention serve the purpose of a more detailed explanation in association with the drawing in which.

DETAILED DESCRIPTION OF THE PREFERRED EMBODIMENTS

Figure 1:
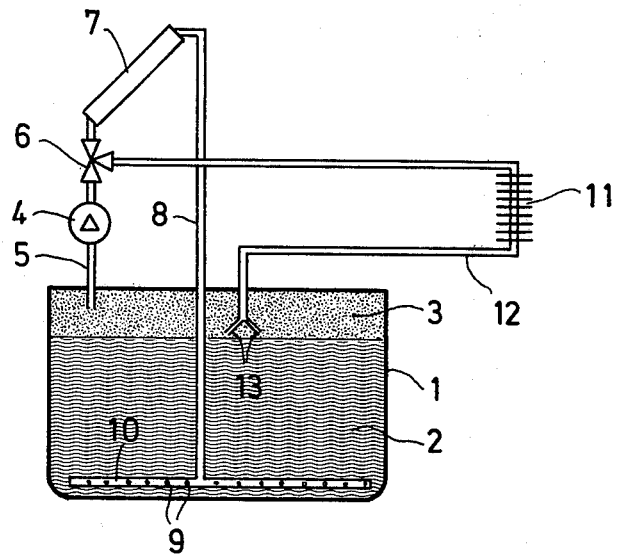
FIG. 1 is a schematic side elevation of a latent-heat accumulator with a charging circuit and a discharging circuit.

The latent-heat accumulator vessel 1 shown in FIG. 1 contains a latent-heat storage medium 2 which in operation is in the liquid state during charging and in the solid state during discharging. As latent-heat storage medium Glauber's salt is preferably employed. Above the latent-heat storage medium 2 a layer of a heat exchanger medium 3 is located, preferably an oil. For charging the heat accumulator, i.e. for the supply of heat into the heat storage medium, a charging circuit is provided, which comprises a suction line 5 fitted with a pump 4, a three-way valve 6, a heat source 7, a feed line 8 and an outlet line 10 located in the region of the bottom of vessel 1 and provided with a multiplicity of apertures 9.

The suction line 5, the pump 4 and the three-way valve 6 also form a part of a discharging circuit, which in addition includes a heat exchanger 11, a feed line 12 and feed apertures 13. In the embodiment illustrated, the feed apertures 13 are arranged above the boundary surface between heat storage medium and heat exchanger medium in such a manner, that the jet of heat exchanger medium issuing from them enters obliquely into the surface of the heat storage medium and only to a limited extent.

For charging the accumulator, the heat exchanger medium is pumped through the charging circuit, in the course of which the exchanger medium warmed up in the heat source 7 transfers its heat on passing through the layer of heat storage medium 2 to the latter, causing it to melt and/or to heat up.

During discharging of the accumulator the heat exchanger medium is pumped through the discharging circuit, during which it transfers the heat extracted from the storage medium 2 to the heat exchanger 11. The heat exchanger medium is introduced into the heat storage medium in such a manner, that it enters into the liquid zone of the storage medium and does not come into contact with the solid bottom deposit of the storage medium. By this means the heat exchanger medium is prevented from being trapped by the crystals forming during the cooling-dependent crystallization of the heat storage medium and drawn by these to the bottom. In addition, owing to the oblique introduction of the heat exchanger medium through feed apertures 13 a circulatory flow results in the liquid zone of the heat storage medium, which leads to an improved mixing and thus to an improved heat transfer. In this manner a surprisingly good heat transfer results, which is in fact at least as good as the heat transfer achieved when, during discharging, the heat exchanger medium is conveyed through the entire layer of the heat storage medium.

Figure 2:
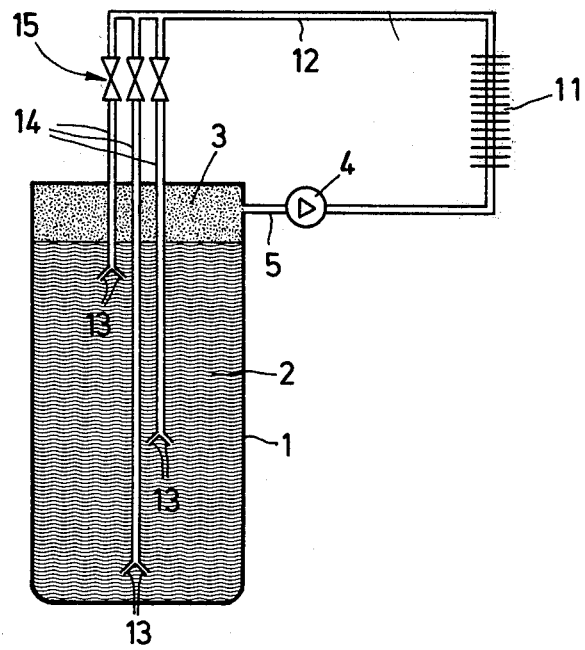
FIG. 2 is a schematic side elevation of another embodiment of a latent-heat accumulator with a discharge circuit.

The heat accumulator shown in FIG. 2 is of substantially the same construction as the heat accumulator in FIG. 1. Corresponding parts bear the same reference numerals. This heat accumulator similarly comprises a charging circuit not shown in the drawing and a discharging circuit which differs from the discharging circuit of the example of embodiment shown in FIG. 1 in that the feed line 12 is connected to several discharge ducts 14 which reach to various depths in the heat storage medium and on the free end of which feed apertures 13 are located. In the discharge ducts 14 check valves 15 are seated which, for example with the aid of a suitable circuit, can be selectively opened and closed.

During operation, the opening and closing of the check valves 15 is effected in such a manner, that a valve is opened only when the associated feed aperture 13 is located in the liquid zone of the heat storage medium. As soon as the boundary surface between solid heat storage medium and liquid heat storage medium rises as far as a feed aperture 13, the corresponding check valve 15 is closed, so that the feed of heat exchanger medium proceeds only in the higher zones of the heat storage medium, that is to say, only in the liquid zone. In this manner, at the beginning of the discharging process, when the entire storage medium is in the liquid state, the admission of heat exchanger medium can be effected over the entire height of the heat storage medium, while in the course of progressive discharging of the heat accumulator it proceeds only in the upper, liquid zones.

In the embodiments illustrated, the feed apertures 13 are so disposed, that in the liquid storage medium a circulatory flow and/or turbulence takes place, while the flow of the heat exchanger medium proceeds preferably along the walls and the bottom of the accumulator vessel. There is obtained in this manner a particularly good mixing of the heat storage medium and an efficient heat transfer associated therewith.

In the embodiment shown in FIG. 1, the charging circuit and the discharging circuit can be rendered operative alternately by corresponding setting of the three-way valve 6. The charging circuit not shown in FIG. 2 can be coupled in a similar manner with the discharging circuit, but it is also possible to provide a completely independent charging circuit.

I claim:

1. A method for alternately charging and discharging a latent heat accumulator including a vessel containing a quantity of heat storage medium which alternately changes from the solid state to the liquid state during addition of heat and from the liquid state to the solid state during the removal of heat and a quantity of a heat exchanger medium which is immiscible with the heat storage medium when the heat storage medium is in the liquid state, comprising the steps of
   (a) pumping the heat exchanger medium from the vessel, through a heat source operable at a relatively high heating temperature, and back to the vessel, thereby to heat the heat storage medium; and
   (b) pumping the heat exchanger medium from the vessel, through a heat exchanger operable at a relatively low cooling temperature, and back to the vessel at a level at which the heat storage medium is in a liquid condition, thereby to cool the heat storage medium, said heat exchanger medium being prevented from coming into direct contact with the heat storage medium when the heat storage medium is in a solid condition, whereby during discharging of the accumulator, entrapment of the cooled heat exchanger medium within the solid portion of the heat storage medium is prevented.

2. A method as claimed in claim 1, wherein the heat exchanger medium is introduced into the liquid heat storage medium in such a manner, that in the latter a circulatory flow and/or turbulence occurs.

3. A method as claimed in claim 2, wherein the heat exchanger medium is directed within the heat storage medium substantially parallel to the wall or the bottom of a storage container or parallel to the boundary surface between the heat storage and heat exchanger mediums, respectively.

4. A method as defined in claim 1, wherein the cooled heat exchanger medium is pumped back into the vessel at a level adjacent the upper surface of the liquid portion of the heat storage medium.

5. A method as claimed in claim 4, wherein the heat exchanger medium is introduced into the storage medium in the form of a jet which is generated above the boundary surface.

6. A method as defined in claim 4, wherein the cooled heat exchanger medium is pumped back into the vessel at a level below the upper surface of the liquid portion of the heat storage medium.

7. A method as defined in claim 4 wherein the cooled heat exchanger medium is pumped back into the vessel obliquely relative to the upper surface of the liquid portion of the heat storage medium.

8. A latent heat accumulator comprising
   (a) a storage vessel (1);
   (b) a quantity of heat storage medium (2) arranged within said vessel, said heat storage medium changing alternatively from the solid state to the liquid state during addition of heat, and from the liquid state to the solid state during the removal of heat;

(c) a quantity of heat exchanger medium (12) initially arranged within said vessel, said heat exchanger medium being immiscible with said heat storage medium when said heat storage medium is in the liquid state; and (d) alternately operable charging and discharging circuit means for heating and cooling said heat storage medium, respectively, comprising (1) a heat source (7) operable at a relatively high treating temperature;

(2) a heat exchanger (11) operable at a relatively low cooling temperature;

(3) three-way valve means (6) alternately operable between first and second conditions;

(4) pumping means (4) operable when said valve means is in said first condition for pumping said heat exchanger medium successively from said vessel, through said heat source, and back to said vessel, thereby to heat said heat storage medium, said pumping means being operable when said valve means is in said second condition for pumping said heat exchanger medium successively from said storage vessel, through said heat exchanger, and back to said vessel, thereby to cool said heat storage medium; and (5) means (13, 14) causing said cooled heat exchanger medium to be returned to said vessel at a level at which said heat storage medium is in a liquid condition, said heat exchanger medium being prevented from coming into direct contact with said heat storage medium when said heat storage medium is in a solid condition, whereby entrapment of said cooled heat exchanger medium within the solid portion of said heat storage medium is prevented.

9. Apparatus as defined in claim 8, and further comprising check valve means (15) for controlling the level at which said cooled heat exchanger medium is introduced into the liquid portion of said heat storage medium.

10. Apparatus as defined in claim 9, wherein said means causing said cooled heat exchanger medium to be returned to said vessel are arranged at various spaced depths below the upper surface of the liquid portion of said heat storage medium.

* * * * *